United States Patent
Hong et al.

(10) Patent No.: US 9,226,229 B2
(45) Date of Patent: Dec. 29, 2015

(54) METHOD FOR INTERNET PROTOCOL-BASED SLEEP MODE CONTROL USING SYNCHRONIZATION INFORMATION

(71) Applicant: ELECTRONICS AND TELECOMMUNICATIONS RESEARCH INSTITUTE, Daejeon (KR)

(72) Inventors: Yonggeun Hong, Daejeon (KR); Myungki Shin, Seoul (KR); Hyoungjun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/454,106

(22) Filed: Aug. 7, 2014

(65) Prior Publication Data

US 2015/0103711 A1    Apr. 16, 2015

(30) Foreign Application Priority Data

Oct. 10, 2013   (KR) .................. 10-2013-0120554

(51) Int. Cl.
*G08C 17/00* (2006.01)
*H04W 52/02* (2009.01)
*H04W 40/10* (2009.01)

(52) U.S. Cl.
CPC .......... *H04W 52/0206* (2013.01); *H04W 40/10* (2013.01)

(58) Field of Classification Search
None
See application file for complete search history.

(56) References Cited

U.S. PATENT DOCUMENTS

| 2010/0069128 | A1 | 3/2010 | Cheng et al. | |
|---|---|---|---|---|
| 2012/0151028 | A1* | 6/2012 | Lu et al. | 709/223 |
| 2012/0188925 | A1 | 7/2012 | Lee et al. | |
| 2015/0036565 | A1* | 2/2015 | Chen et al. | 370/311 |

FOREIGN PATENT DOCUMENTS

| KR | 10-2011-0081982 | | 7/2011 |
|---|---|---|---|
| KR | 10-2013-0089209 | | 8/2013 |
| WO | WO 2015/004506 | * | 1/2015 |

* cited by examiner

*Primary Examiner* — Edan Orgad
*Assistant Examiner* — Rebecca Song
(74) *Attorney, Agent, or Firm* — Kile Park Reed & Houtteman PLLC

(57) ABSTRACT

A method for Internet Protocol based sleep mode control using synchronization information includes setting some of the IP-based internal hosts of a sleep mode control network to a sleep mode, providing, by a base station, a synchronization signal with respect to the overall network, thereby transferring the synchronization information of a PHY/MAC layer based on a response thereto to an internal router, and updating, by the internal router having received the synchronization information of the network layer from the base station, the state of the corresponding hosts to a sleep mode, and then transmitting, by the internal router, information about the internal hosts in a sleep mode to the external hosts of a history information list because the internal router stores the history information of the external hosts that have communicated with the internal hosts in a sleep mode in the form of a list.

13 Claims, 12 Drawing Sheets

METHOD FOR INTERNET PROTOCOL-BASED SLEEP MODE CONTROL USING SYNCHRONIZATION INFORMATION

CROSS-REFERENCE TO RELATED APPLICATION

This application claims the benefit of Korean Patent Application No. 10-2013-0120554, filed Oct. 10, 2013, which is hereby incorporated by reference herein in its entirety.

BACKGROUND OF THE INVENTION

1. Technical Field

The present disclosure relates generally to a method for Internet Protocol (IP)-based sleep mode control using synchronization information and, more particularly, to a method for IP-based sleep mode control using synchronization information, which is capable of determining whether internal hosts are in a sleep mode using synchronization information provided by a base station or an Access Point (AP) and also efficiently dealing with a request for communication with the internal hosts in a sleep mode that is made from external hosts.

2. Description of the Related Art

As a related technology, Korean Patent Application Publication No. 2011-0081982 discloses methods and systems for state-driven power saving for WiMAX. This technology provides methods and systems that are capable of saving the battery power of a mobile device by dynamically adjusting the clock frequency and/or voltage of the processor of a mobile device for wireless communication based on the state of a media access control (MAC) layer. The consumption of battery power can be reduce by using higher clock frequency and/or higher voltage for a normal operation state involving a large amount of data traffic and lower clock frequency and/or lower voltage for different MAC layer states (synchronous acquisition, network entry, and sleep/idle states), and thus the time for which a device can operate between battery charging cycles is extended.

As another related technology, Korean Patent Application Publication No. 10-2013-0089209A discloses an apparatus and method for data transmission and reception in a communication system, which is illustrated in FIG. 2. This technology provides an apparatus and method for data transmission and reception that are capable of achieving accurate synchronization between an AP and a plurality of terminals, that is, stations, in a communication system, thereby maintaining Quality of Service (QoS) and also maximizing the power saving of the terminals. The apparatus for the transmission and reception of data includes a reception unit configured to receive a beacon frame transmitted from the AP in accordance with a beacon period via a new frequency band for data transmission and reception between a plurality of terminals and an AP; an estimation unit configured to estimate a carrier frequency error value in the physical (PHY) layer of the new frequency band and to estimate the time at which the beacon frame will be received using the estimated carrier frequency error value; and a control unit configured to switch the terminals from a sleep mode to a reception standby mode in accordance with the time at which the beacon frame will be received.

SUMMARY OF THE INVENTION

Accordingly, at least one embodiment of the present invention is intended to provide a method for IP-based sleep mode control using synchronization information, which is capable of determining whether internal hosts are in a sleep mode using synchronization information provided by a base station or an AP and also transferring sleep mode information to an external host.

At least one embodiment of the present invention is intended to provide a method for IP-based sleep mode control using synchronization information, which is capable of efficiently dealing with a request for communication with the internal hosts in a sleep mode that is made from the external hosts.

In accordance with another aspect of the present invention, there is provided a method for Internet Protocol (IP)-based sleep mode control using synchronization information, the method being performed by IP-based hosts in a network including a sleep mode control network including the internal hosts and an internal router responsible for communication of the internal hosts, and also including an external router connected to the internal router responsible for communication of the sleep mode control network, IP-based external hosts connected via the external router, and a base station configured to provide a synchronization signal, the method including setting some of the IP-based internal hosts of the sleep mode control network to a sleep mode; providing, by the base station, a synchronization signal with respect to the overall network, thereby transferring the synchronization information of a PHY/MAC layer based on a response thereto to the internal router; and updating, by the internal router having received the synchronization information of the network layer from the base station, the state of the corresponding hosts to a sleep mode, and then transmitting, by the internal router, information about the internal hosts in a sleep mode to the external hosts of a history information list because the internal router stores the history information of the external hosts that have communicated with the internal hosts in a sleep mode in a list form.

In accordance with another aspect of the present invention, there is provided a method for Internet Protocol (IP)-based sleep mode control using synchronization information, the method being performed by an internal router in a network including a sleep mode control network including internal hosts and the internal router responsible for communication of the internal hosts, and also including an external router connected to the internal router responsible for communication of the sleep mode control network, IP-based external hosts connected via the external router, and a base station configured to provide a synchronization signal, the method including requesting, by the internal router within the sleep mode control network, the sleep mode of the IP-based internal hosts; setting some of the IP-based internal hosts having received the sleep mode request from the internal router to a sleep mode; providing, by the base station, a synchronization signal with respect to the overall network, thereby transferring the synchronization information of a PHY/MAC layer based on a response thereto to the internal router of a network layer; and updating, by the internal router having received the synchronization information of the network layer from the base station, the state of the corresponding hosts to a sleep mode, and then transmitting, by the internal router, information about the internal hosts in a sleep mode to the external hosts of a history information list because the internal router stores the history information of the external hosts that have communicated with the internal hosts in a sleep mode in a list form.

Transferring the synchronization information of a PHY/MAC layer to the internal router of the network layer may include transferring the synchronization information to the internal router of the network layer using a layer 2 message, layer 3 message, or cross-layer technique.

In accordance with still another aspect of the present invention, there is provided a method for Internet Protocol (IP)-based sleep mode control using synchronization information, the method being performed in the case where a communication attempt is made from an external network with internal hosts set to a sleep mode in a network including a sleep mode control network including the internal hosts and an internal router responsible for communication of the internal hosts, and also including an external router connected to the internal router responsible for communication of the sleep mode control network, IP-based external hosts connected via the external router, and a base station configured to provide a synchronization signal, the method including transmitting a packet from the external hosts to the internal router via the external router, with the IP-based internal hosts having been set to a sleep mode; receiving, by the internal router, the synchronization information of a network layer from the base station; determining, by the internal router, whether a destination host of the packet is in a sleep mode; and, if the destination host of the packet is in a sleep mode, transmitting, by the internal router, a message indicative that the destination host is in a sleep mode to the external hosts having transmitted the packet via the external router.

Determining whether the destination host of the packet is in a sleep mode may include, if the destination host of the packet is not in a sleep mode, transferring the packet.

Transmitting the message indicative that the destination host is in a sleep mode may include transmitting a message that is configured such that the sleep mode of the destination host is identified by selecting an error code value of an error message "destination unreachable."

Transmitting the message indicative that the destination host is in a sleep mode may include transferring, by the external host having received the message indicative that the destination host is in a sleep mode, information about the destination host in a sleep mode from a network layer to a transport layer and an application layer using a cross-layer method.

In accordance with still another aspect of the present invention, there is provided a method for Internet Protocol (IP)-based sleep mode control using synchronization information, the method being performed by IP-based internal hosts in a network including a sleep mode control network including the internal hosts and an internal router responsible for the communication of the internal hosts, and also including an external router connected to the internal router responsible for the communication of the sleep mode control network, IP-based external hosts connected via the external router, and an access point (AP) configured to provide synchronization information, the method including setting some of the IP-based internal hosts within the sleep mode control network to a sleep mode; providing, by the AP, a synchronization signal with respect to the sleep mode control network, thereby transferring the synchronization information of a PHY/MAC layer based on a response thereto to the internal router of a network layer, so that the internal router is aware of the internal hosts in a sleep mode; and transmitting, by the internal router having received the synchronization information of the network layer from the AP, information about the internal hosts in a sleep mode to the external hosts of a history information list because the internal router stores history information of the external hosts that have communicated with the internal hosts in a sleep mode in a list form.

In accordance with still another aspect of the present invention, there is provided a method for Internet Protocol (IP)-based sleep mode control using synchronization information, the method being performed by an internal router in a network including a sleep mode control network including internal hosts and the internal router responsible for communication of the internal hosts, and also including an external router connected to the internal router responsible for communication of the sleep mode control network, IP-based external hosts connected via the external router, and an access point (AP) configured to provide synchronization information, the method including making, by the internal router within the sleep mode control network, a request for a sleep mode of the IP-based internal hosts; setting one of the IP-based internal hosts having received the sleep mode request from the internal router to a sleep mode; providing, by the AP, a synchronization signal with respect to the sleep mode control network, thereby transferring the synchronization information of a PHY/MAC layer based on a response thereto to the internal router of a network layer, so that the internal router is aware of the internal hosts in a sleep mode; and transmitting, by the internal router having received the synchronization information of the network layer from the AP, information about the internal hosts in a sleep mode to the external hosts of a history information list because the internal router stores history information of the external hosts that have communicated with the internal hosts in a sleep mode in a list form.

In accordance with still another aspect of the present invention, there is provided a method for Internet Protocol (IP)-based sleep mode control using synchronization information, the method being performed when a communication attempt is made from an external network with the internal hosts set to a sleep mode in a network including a sleep mode control network including the internal hosts and the internal router responsible for communication of the internal hosts, and also including an external router connected to the internal router responsible for communication of the sleep mode control network, IP-based external hosts connected via the external router, and an access point (AP) configured to provide synchronization information, the method including transmitting a packet to the internal router from the external hosts through the external router with one or more internal hosts set to a sleep mode on the sleep mode control network; receiving, by the internal router, synchronization information of a network layer from the AP; determining, by the internal router, whether a destination host of the packet in a sleep mode; and, if the destination host of the packet is in a sleep mode, transmitting, by the internal router, a message indicative that the destination host is in a sleep mode to the external hosts that have transmitted the packet via the external router.

Determining whether the destination host of the packet in a sleep mode may include, if the destination host is not in a sleep mode, transferring the packet.

Transmitting the message indicative that the destination host is in a sleep mode may include transmitting a message that is configured such that the sleep mode of the destination host is identified by selecting an error code value of an error message "destination unreachable."

Transmitting the message indicative that the destination host is in a sleep mode may include transferring, by the external host having received the message indicative that the destination host is in a sleep mode, information about the destination host in a sleep mode from a network layer to a transport layer using a cross-layer method thereby, enabling a communication re-attempt to be made later.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The following description merely illustrates the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements reciting principles, aspects, and embodiments of the invention, as well as specific examples thereof, are intended to encompass structural and functional equivalents thereof.

The above-described objects, features and advantages will be more apparent from the following detailed description when taken in conjunction with the accompanying drawings. In the following description of the present invention, detailed descriptions of well-known functions and configurations which are deemed to make the gist of the present invention obscure will be omitted.

Embodiments of the present invention will be described in detail below with reference to the accompanying drawings.

Figure 1:
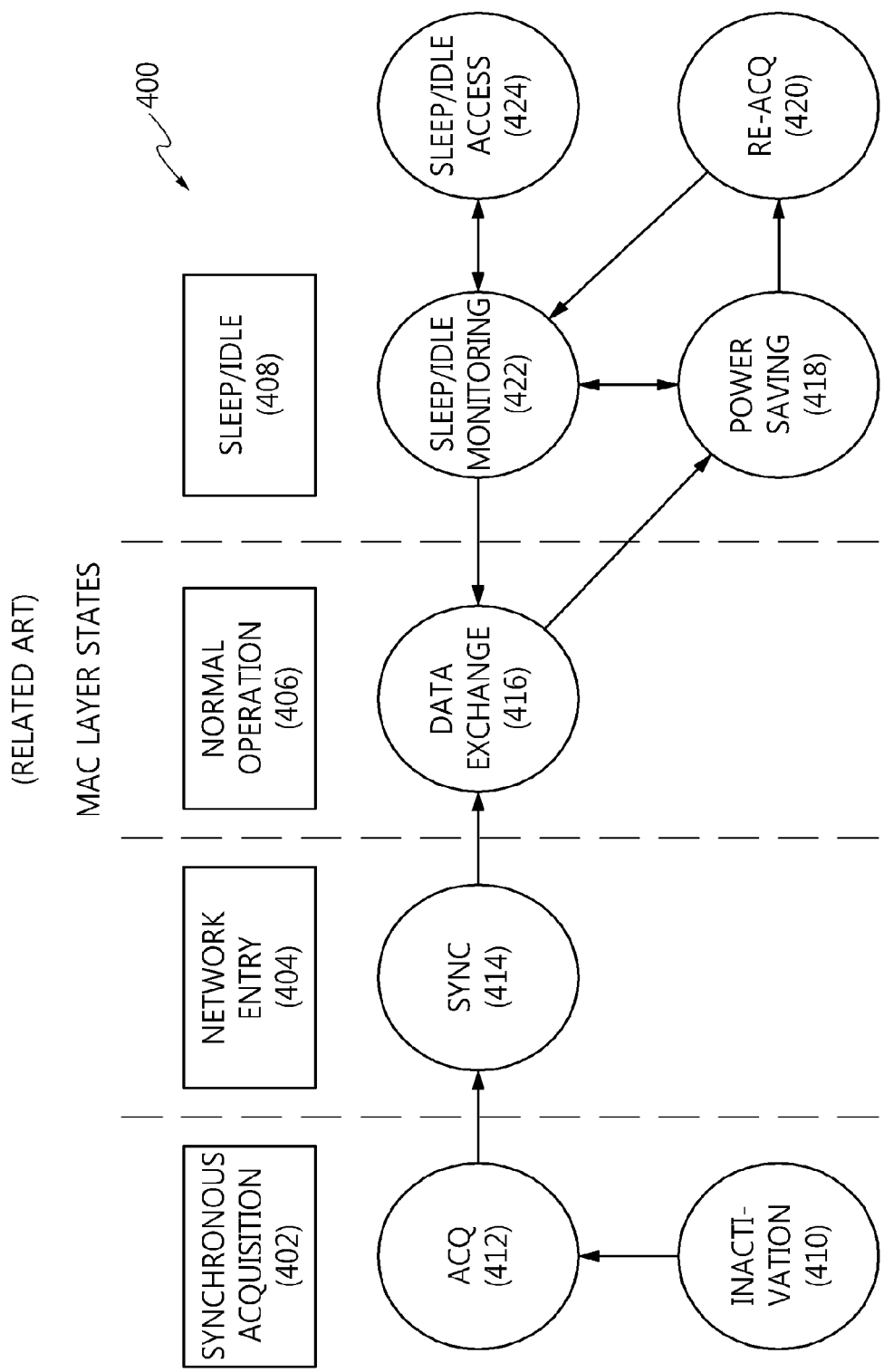
FIG. 1 is a diagram illustrating the configuration of technology for state-driven power savings for WiMAX as a related technology.
Figure 2:
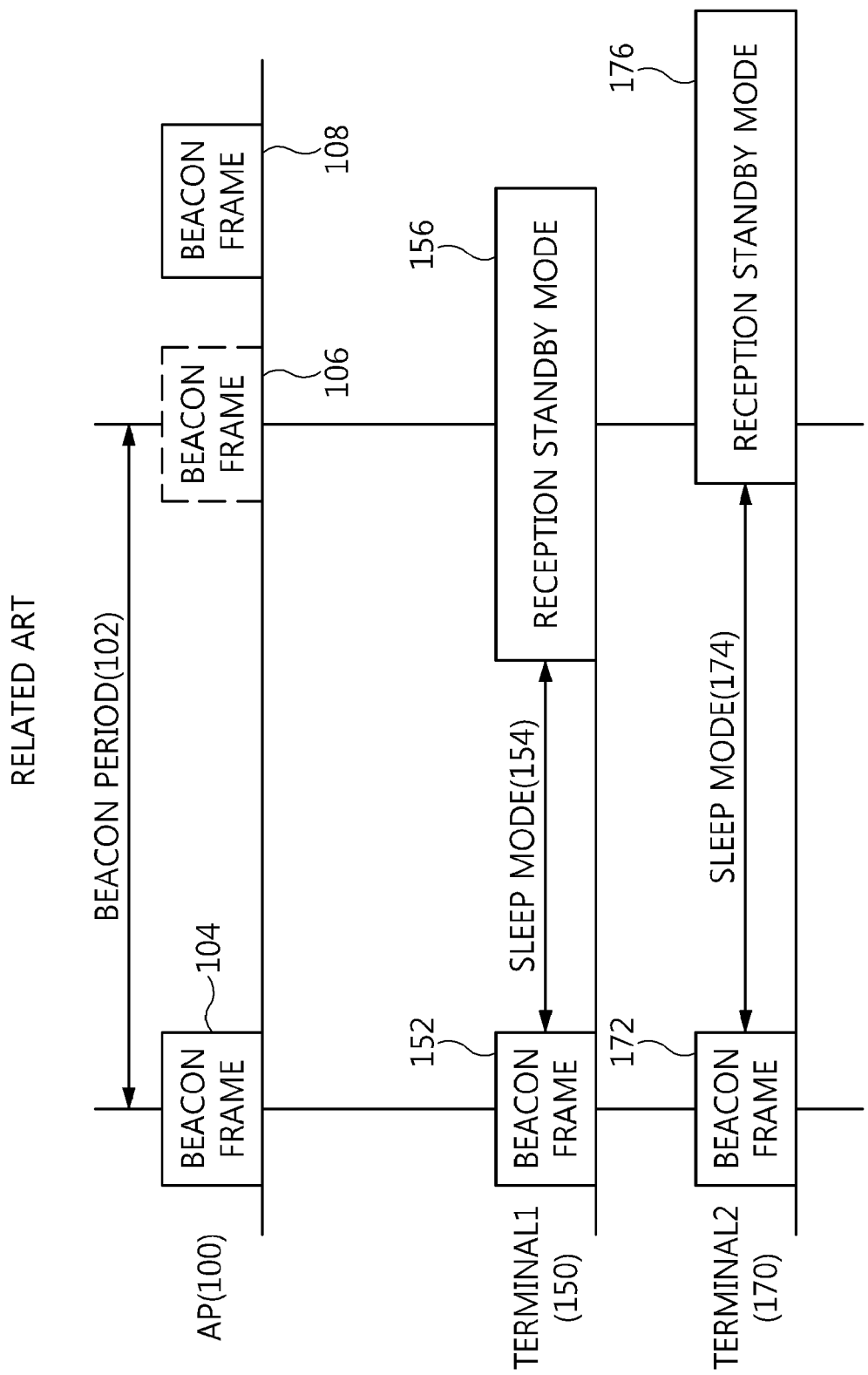
FIG. 2 is a diagram illustrating the configuration of an apparatus and method for data transmission and reception in a communication system as another related technology.
Figure 3:
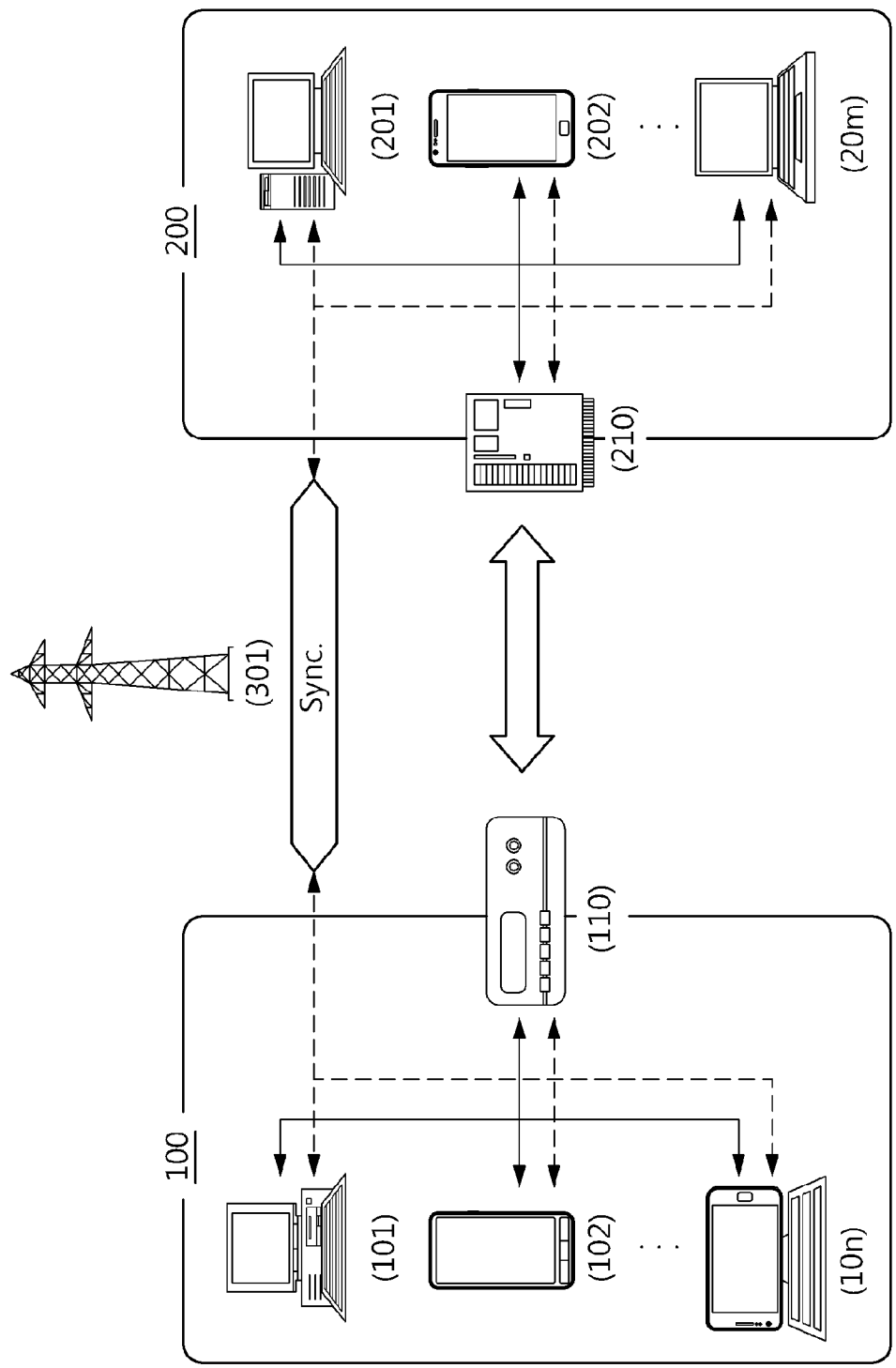
FIG. 3 is a diagram illustrating the configuration of a network for IP-based sleep mode control using synchronization information according to an embodiment of the present invention.

FIG. 3 is a diagram illustrating the configuration of a network for IP-based sleep mode control using synchronization information according to an embodiment of the present invention. The network for IP-based sleep mode control using synchronization information according to an embodiment of the present invention includes a sleep mode control network 100 including one or more IP-based internal hosts 101 to 10$n$ and an internal router 110 responsible for the communication of the IP-based hosts 101 to 10$n$, and also includes an external router 210 connected to the internal router 110 responsible for the communication of the sleep mode control network 100 and IP-based external hosts 200 to 20$n$ connected over an external network 200 including the external router 210. When a base station or an access point (AP) is applied to the configuration of the network, the base station or AP provides a synchronization signal, and the synchronization information of a PHY/MAC layer is provided. The synchronization information may be a pilot signal provided by the base station in the case of mobile communication, and may be a beacon signal provided by the AP in the case of a WLAN. FIG. 3 illustrates a configuration in which a synchronization signal is provided by the base station 301.

Figure 4:
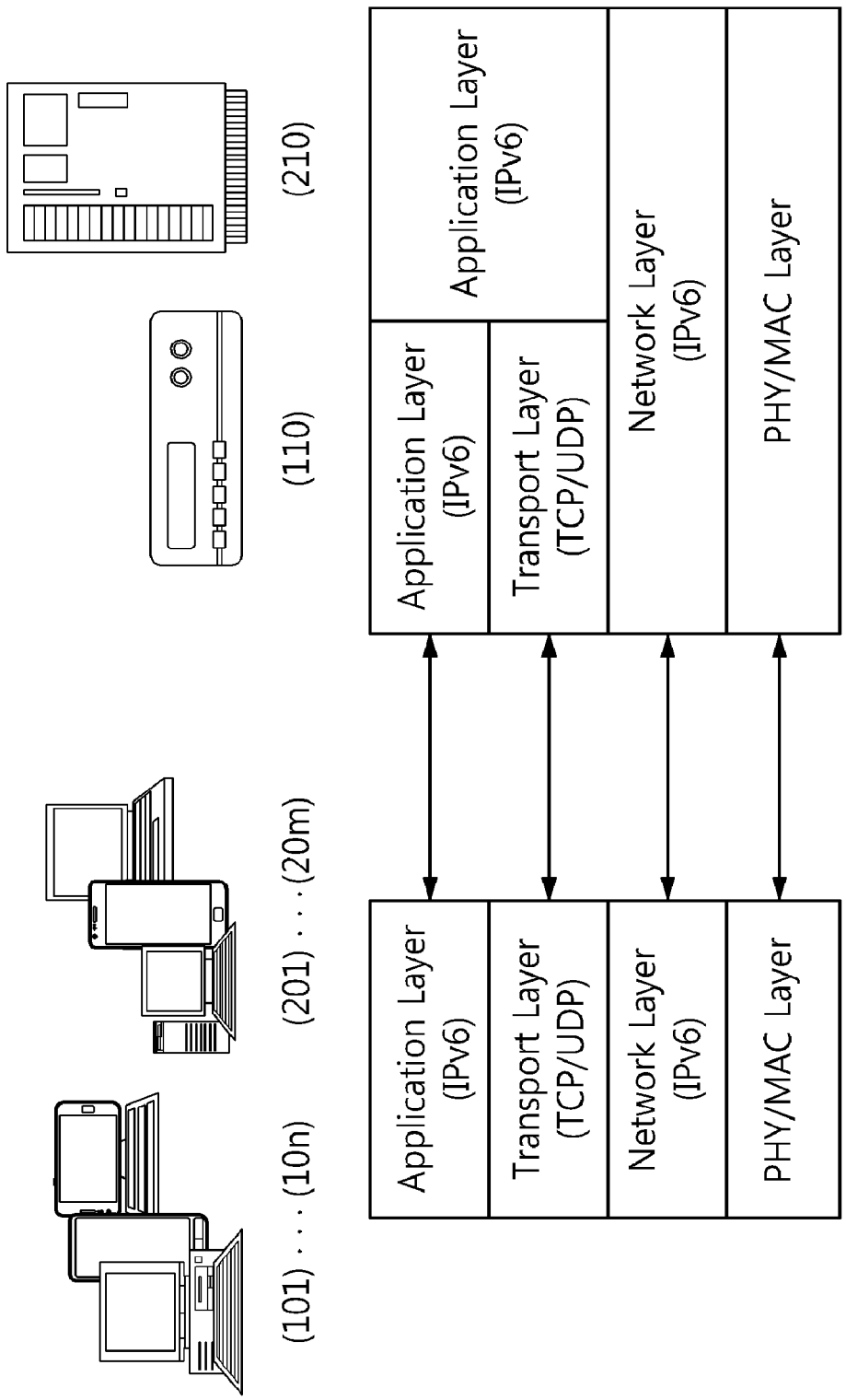
FIG. 4 illustrates an example of the protocol relationships of a network for IP-based sleep mode control using synchronization information according to an embodiment of the present invention.

FIG. 4 illustrates an example of the protocol relationships among the internal hosts 101 to 10$n$, internal router 110, the external router 210, and the external hosts 201 to 20$n$ on the network for IP-based sleep mode control using synchronization information according to an embodiment of the present invention. Each of the internal router 110 and the external router 210 forms a PHY/MAC layer, a network layer, a transport layer, and an application layer in order to communicate with the internal hosts 101 to 10$n$ or external hosts 201 to 20$n$. Each of the internal router 110 and the external router 210 communicates with the internal network hosts 100 to 10$n$ or external hosts 201 to 20$n$ while converting data packets using IP IDs.

Although IP is used in a general TCP/IP protocol-based network layer, it is also used in an application layer. In the network according to this embodiment of the present invention, different PHY/MAC layer IDs may be used by adding the network layer to the PHY/MAC layer and performing a cooperative operation in the network layer using an IP ID. Furthermore, the PHY/MAC layer and the network layer may be used in the same forms as the general PHY/MAC layer and the general network layer, or in simplified forms.

Figure 5:
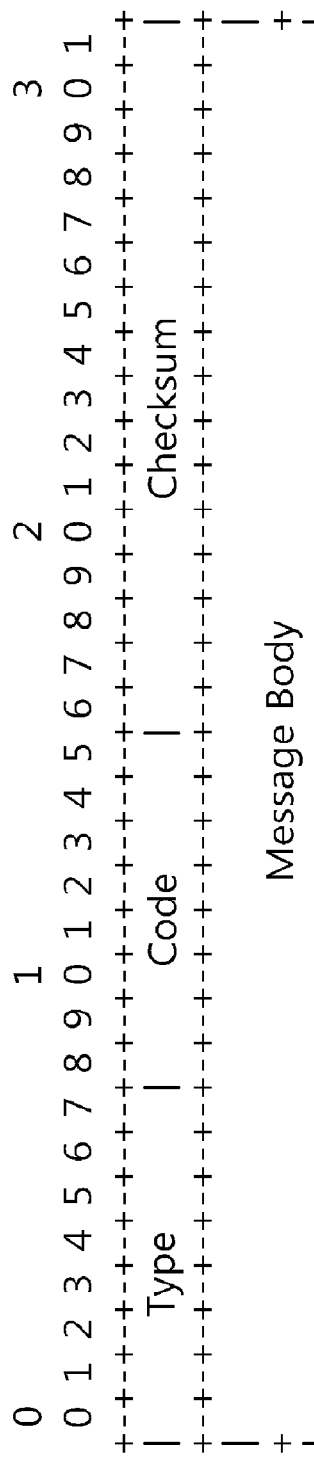
FIG. 5 is a diagram illustrating the configuration of an ICMPv6 message used in IP-based sleep mode control according to an embodiment of the present invention.

FIG. 5 is a diagram illustrating the configuration of an Internet Control Message Protocol for IPv6 (ICMPv6) message as an example of a message that is used in IP-based sleep mode control according to an embodiment of the present invention. ICMPv6 stipulates that error messages and informational messages may be transmitted and that the types of errors may be identified by error types. Furthermore, for the extended application of ICMPv6, a user may newly define a code value and the details of an error and then use them.

The IP-based sleep mode control method according to the present invention provides:

a sleep mode control method in a network including a sleep mode control network 100 including one or more internal hosts 101 to 10$n$ and an internal router 110 responsible for the communication of the internal hosts 101 to 10$n$, and also including an external router 210 connected to the internal router 110 responsible for the communication of the sleep mode control network 100, IP-based external hosts 201 to 20$n$ connected via the external router 210, and a base station 301 configured to provide a synchronization signal; and a sleep mode control method in a network including a sleep mode control network 100 including one or more internal hosts 101 to 10n and an internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and an AP configured to provide synchronization information.

Figure 6:
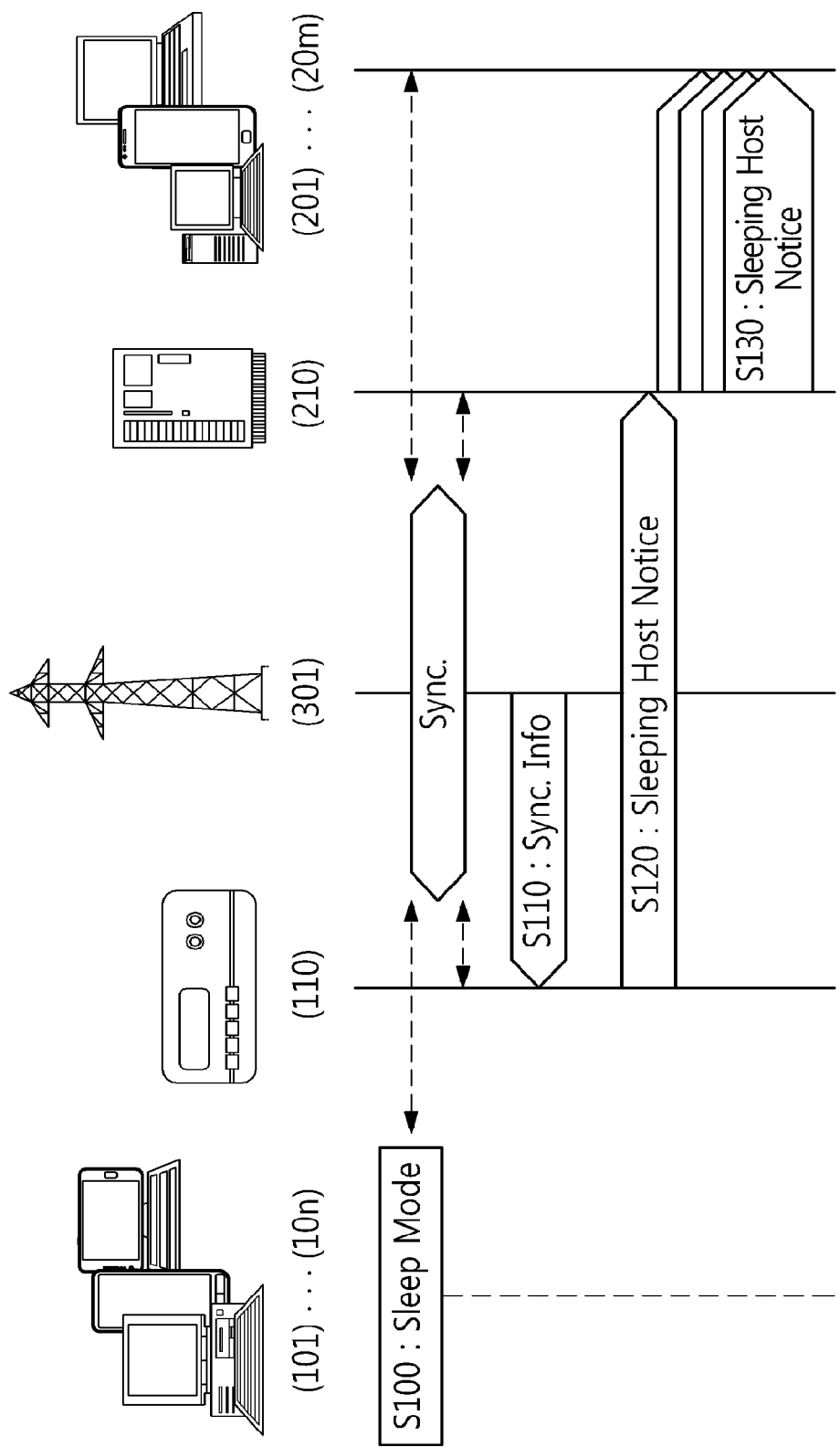
FIG. 6 is a diagram illustrating a sleep mode control method using synchronization information from a base station according to an embodiment of the present invention.

FIG. 6 illustrates a sleep mode control method that is performed by IP-based hosts 101 to 10n in a network including a sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and a base station 301 configured to provide a synchronization signal.

When some of the IP-based internal hosts 101 to 10n of the sleep mode control network 100 are set to a sleep mode at step S100, the base station 301 provides a synchronization signal with respect to the overall network, thereby transferring the synchronization information of a PHY/MAC layer based on a response thereto to the internal router 110 of a network layer at step S110. In this case, the synchronization information is transferred to the internal router 110 of the network layer using a layer 2 message, layer 3 message, or cross-layer technique at step S110.

The internal router 110 that has received the synchronization information of the network layer from the base station 301 updates the state of the corresponding hosts to a sleep mode, and then transmits information about the internal hosts in a sleep mode to the external hosts 201 to 20n of a history information list because the internal router 110 stores the history information of the external hosts 201 to 20n that have communicated with the internal hosts in a sleep mode in the form of a list at steps S120 and S130.

Accordingly, the external hosts 201 to 20n that communicated with the internal hosts in a sleep mode may be aware of the internal hosts 101 to 10n in a sleep mode on the sleep mode control network 100. The above-described sleep mode control method is suitable for the case where a configuration is made such that a sleep mode is performed by the IP-based hosts 101 to 10n within the sleep mode control network 100.

Figure 7:
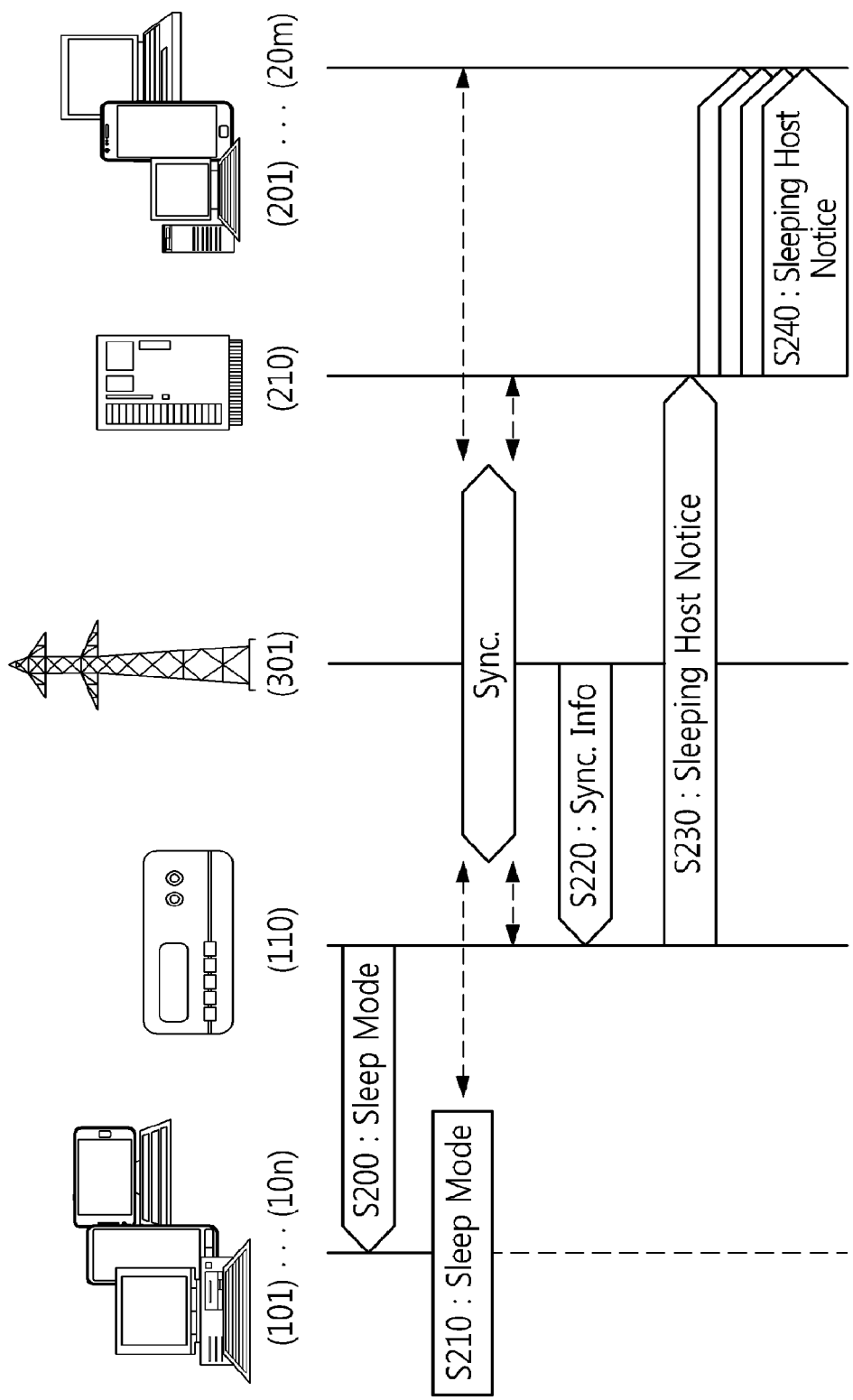
FIG. 7 is a diagram illustrating a method for sleep mode control that is performed when a communication attempt is made from an external network with internal hosts set to a sleep mode using synchronization information from a base station.

FIG. 7 illustrates a sleep mode control method that is performed by an internal router 110 in a network including a sleep mode control network 100 including internal hosts 101 to 10n and the internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and a base station 301 configured to provide a synchronization signal.

First, when the sleep mode of the IP-based internal hosts 101 to 10n is requested by the internal router 110 within the sleep mode control network 100 at step S200:

one of the IP-based internal hosts 101 to 10n that has received the sleep mode request from the internal router 110 is set to a sleep mode at step S210; and the base station 301 provides a synchronization signal with respect to the overall network, thereby transferring the synchronization information of a PHY/MAC layer based on a response thereto to the internal router 110 of a network layer at step S220. In this case, the synchronization information is transferred to the internal router 110 of the network layer using a layer 2 message, layer 3 message, or cross-layer technique at step S220.

The internal router 110 that has received the synchronization information of the network layer from the base station 301 updates the state of the corresponding hosts to a sleep mode, and then transmits information about the internal hosts in a sleep mode to the external hosts 201 to 20n of a history information list because the internal router 110 stores the history information of the external hosts 201 to 20n that have communicated with the internal hosts in a sleep mode in the form of a list at steps S230 and S240.

Accordingly, the external hosts 201 to 20n that communicated with the internal hosts in a sleep mode may be aware of the internal hosts 101 to 10n in a sleep mode on the sleep mode control network 100. This sleep mode control method is suitable for the case where a configuration may be made such that a sleep mode is performed by the internal router 110 within the sleep mode control network 100.

Figure 8:
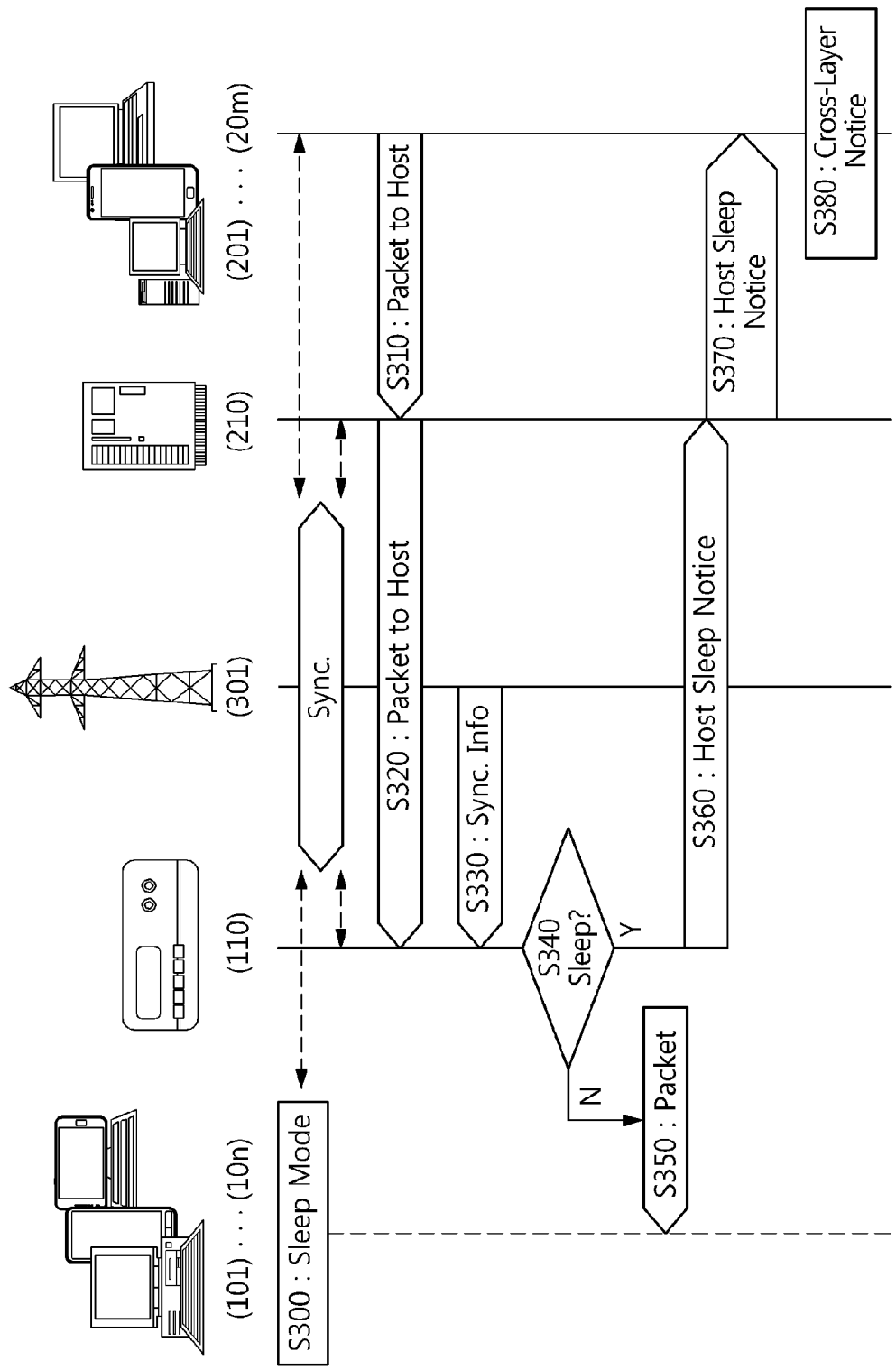
FIG. 8 is a diagram illustrating the configuration of a network for IP-based sleep mode control using synchronization information according to another embodiment of the present invention.

FIG. 8 illustrates a sleep mode control method in the case where a communication attempt is made from an external network with internal hosts 101 to 10n set to a sleep mode in a network including a sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and an AP configured to provide synchronization information.

When a packet is transmitted to the internal router 110 from the external hosts 201 to 20n via the external router 210 at steps S310 and S320 in the state in which one or more IP-based internal hosts 101 to 10n have been set to a sleep mode at step S300:

the internal router 110 receives the synchronization information of a network layer from the base station 301 S330;

the internal router 110 determines whether the destination host of the packet is in a sleep mode at step S340;

the internal router 110, if the destination host of the packet is not in a sleep mode, transfers the packet at step S350; and the internal router 110, if the destination host of the packet is in a sleep mode, transmits a message indicative that the destination host is in a sleep mode to the external hosts 201 to 20n that have transmitted the packet via the external router 210 at steps S360 and S370. In this case, the message may be configured such that the sleep mode of the destination host is identified by selecting the error code value of the error message "destination unreachable" described in FIG. 5.

At steps S360 and S370 of transmitting a message indicative that the destination host is in a sleep mode, the external host that has received the message indicative that the destination host is in a sleep mode transfers information about the destination host in a sleep mode from a network layer to a transport layer and an application layer using a cross-layer method at step S380, thereby enabling a communication re-attempt to be made later.

Figure 9:
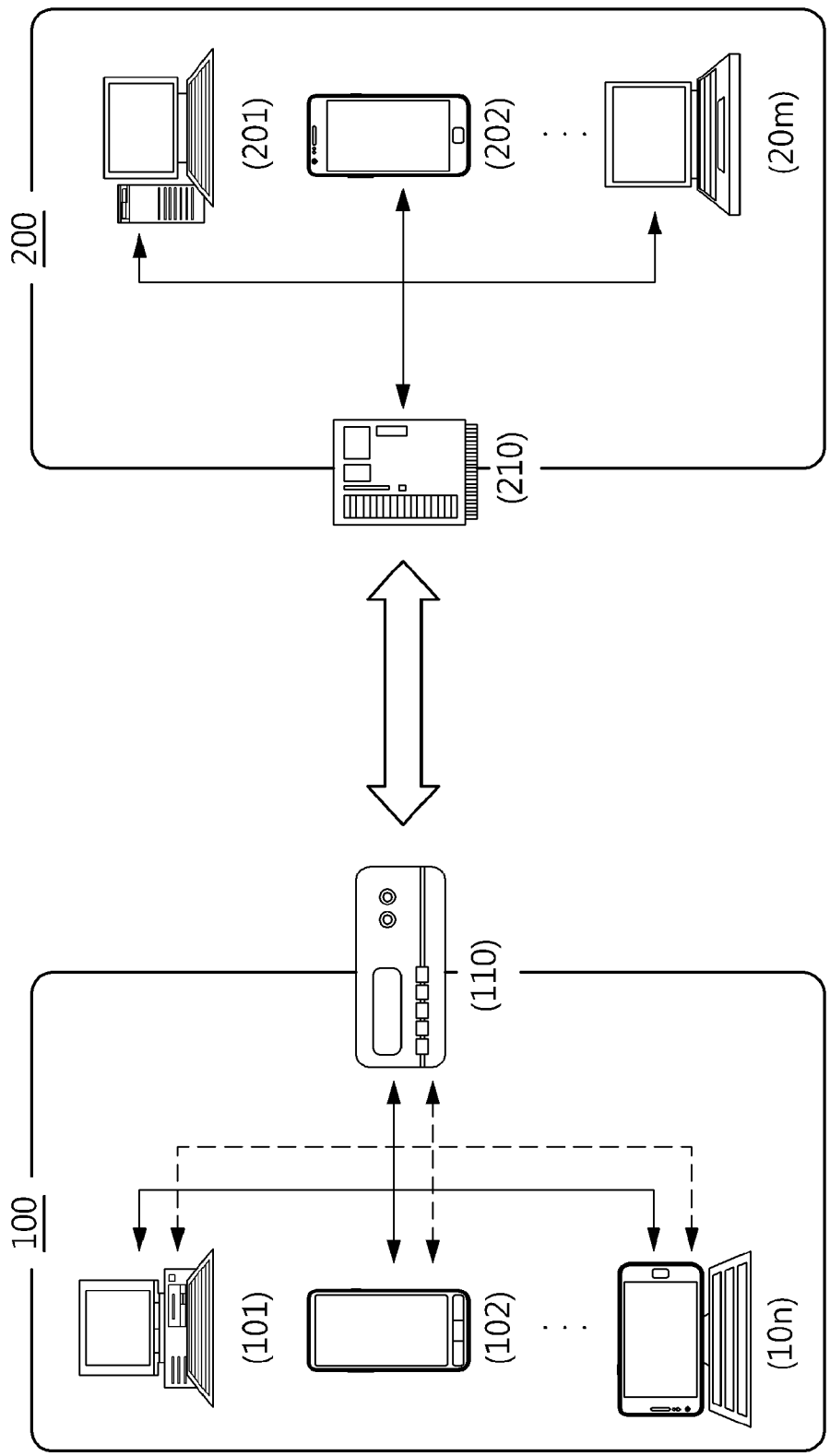
FIG. 9 is a diagram illustrating a sleep mode control method using synchronization information from an AP according to an embodiment of the present invention.

FIG. 9 illustrates the configuration of a network for IP-based sleep mode control using synchronization information according to another embodiment of the present invention. The network for IP-based sleep mode control using synchronization information according to this embodiment of the present invention includes a sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100 and IP-based external hosts 201 to 20n connected via the external router 210. When an AP is applied to the network configuration, the AP provides a synchronization signal, and the synchronization information of the PHY/MAC layer is provided. A common base station is a layer 1/2 entity, and a router is a layer 3 entity. In the case of a WLAN, a single router is responsible for a plurality of access points (APs). The base station may be located between the host and the router. Although the base station and the router may be separate from each other, the base station and the router may be integrated into a single configuration. In FIG. 9, the case where an AP is provided in the internal router 110 is illustrated in order to make the characteristic configuration of the present invention clear.

Figure 10:
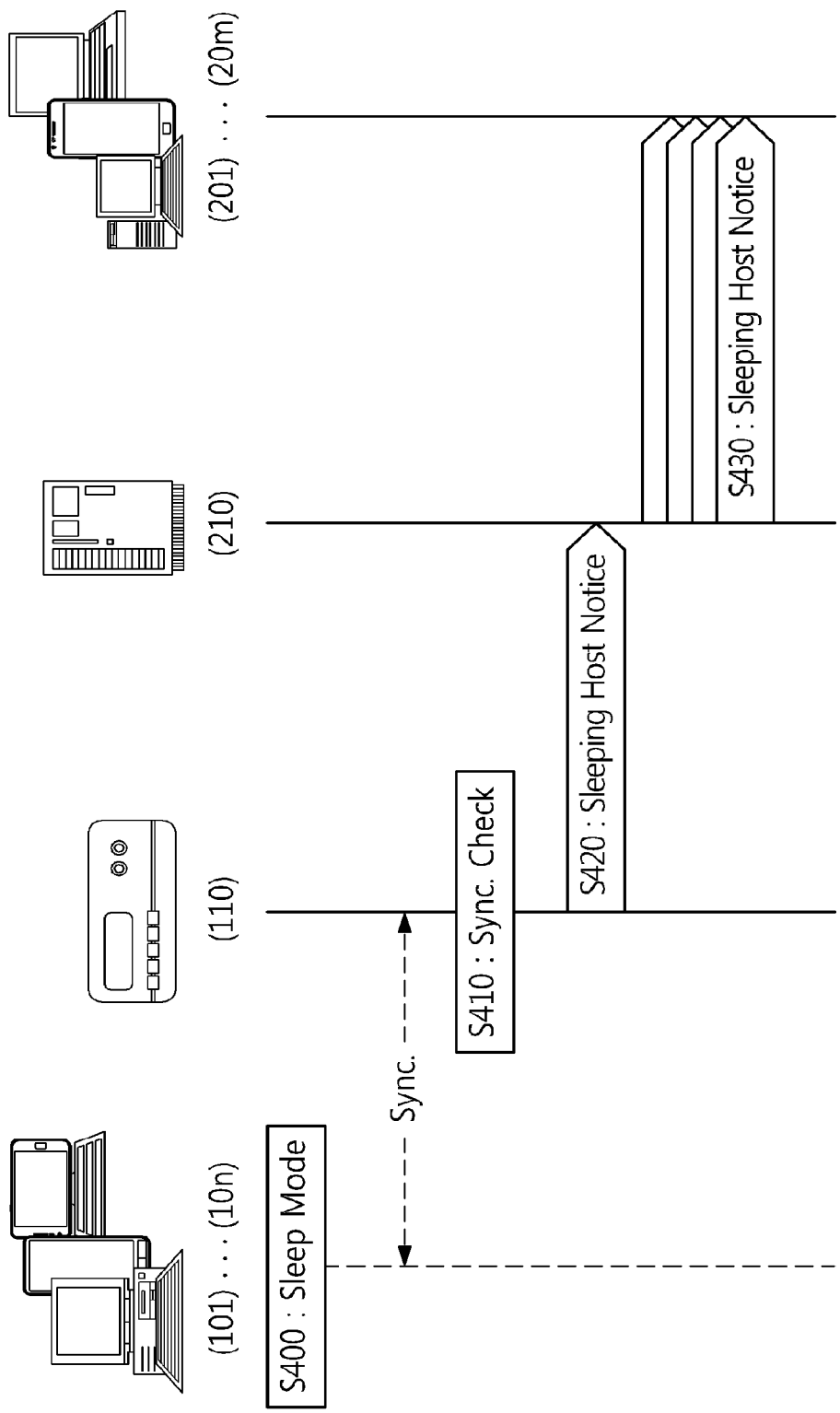
FIG. 10 is a diagram illustrating a method for sleep mode control that is performed by IP-based internal hosts in a network.

FIG. 10 illustrates a sleep mode control method that is performed by IP-based internal hosts 101 to 10n in a network including a sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and an AP configured to provide synchronization information.

When some of the IP-based internal hosts 101 to 10n within the sleep mode control network 100 are set to a sleep mode at step S400, the AP provides a synchronization signal with respect to the sleep mode control network 100, thereby transferring the synchronization information of a PHY/MAC layer based on a response thereto to the internal router 110 of a network layer, so that the internal router 110 is aware of the internal hosts 101 to 10n in a sleep mode at step S410.

The internal router 110 that has received the synchronization information of the network layer from the AP transmits information about the internal hosts in a sleep mode to the external hosts 201 to 20n of a history information list because the internal router 110 stores the history information of the external hosts 201 to 20n that have communicated with the internal hosts in a sleep mode in the form of a list at steps S420 and S430. In this case, the message may be an ICMPv6 message.

Accordingly, the external hosts 201 to 20n that have communicated with the internal hosts in a sleep mode may be aware of the internal hosts 101 to 10n in a sleep mode on the sleep mode control network 100.

Figure 11:
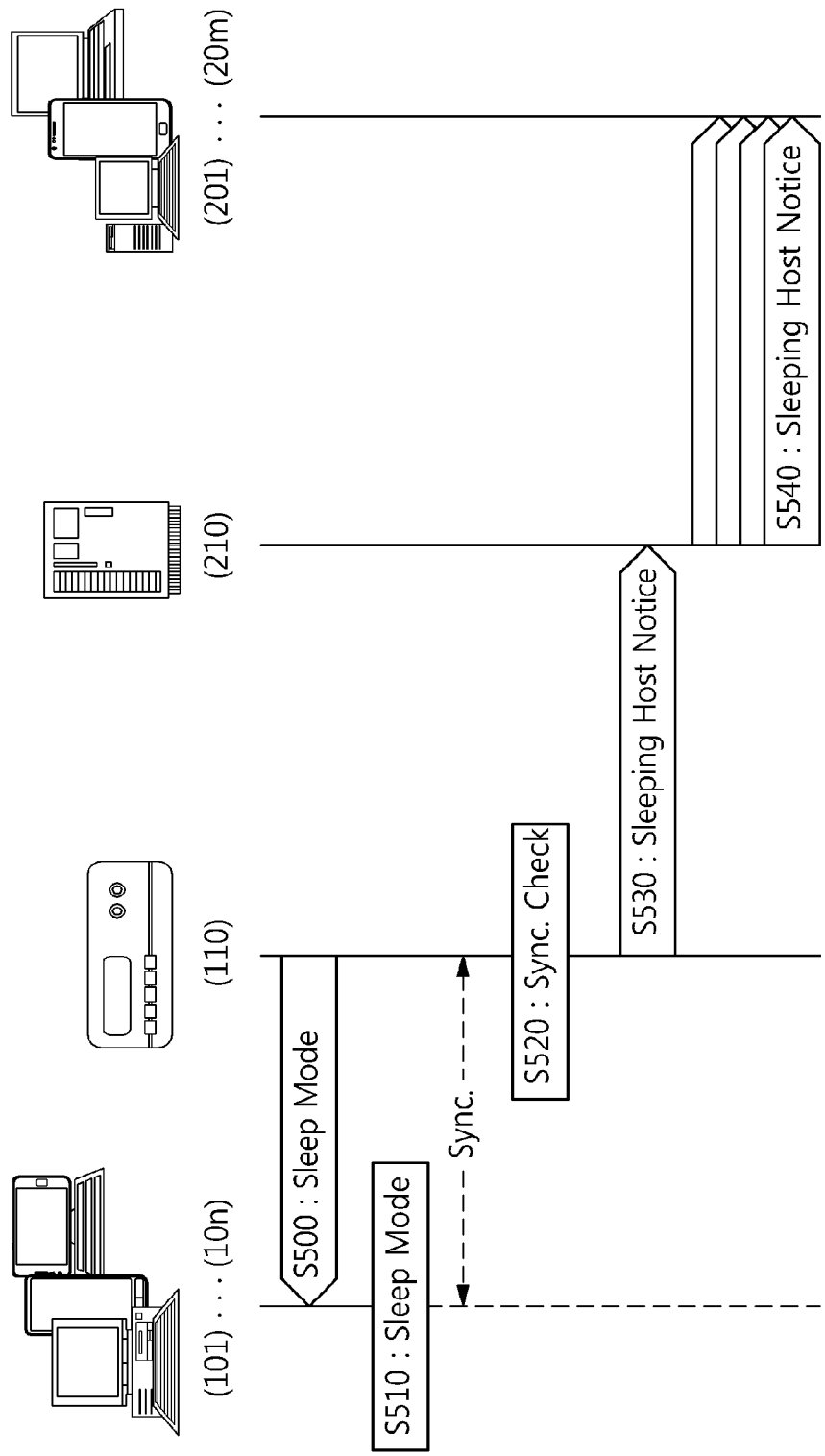
FIG. 11 is a diagram illustrating a method for sleep mode control that is performed by an internal router in a network.

FIG. 11 illustrates a sleep mode control method that is performed by an internal router 110 in a network including a sleep mode control network 100 including internal hosts 101 to 10n and the internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and an AP configured to provide synchronization information.

First, when a request for the sleep mode of the IP-based internal hosts 101 to 10n is made by the internal router 110 within the sleep mode control network 100 at step S500:

one of the IP-based internal hosts 101 to 10n that has received the sleep mode request from the internal router 110 is set to a sleep mode at step S510; and the AP provides a synchronization signal with respect to the sleep mode control network 100, thereby transferring the synchronization information of a PHY/MAC layer based on a response thereto to the internal router 110 of a network layer, so that the internal router 110 is aware of the internal hosts 101 to 10n in a sleep mode at step 520.

The internal router 110 that has received the synchronization information of the network layer from the AP transmits information about the internal hosts in a sleep mode to the external hosts 201 to 20n of a history information list because the internal router 110 stores the history information of the external hosts 201 to 20n that have communicated with the internal hosts in a sleep mode in the form of a list at steps S530 and S540. In this case, the message may be an ICMPv6 message.

Accordingly, the external hosts 201 to 20n that have communicated with the internal hosts in a sleep mode may be aware of the internal hosts 101 to 10n in a sleep mode on the sleep mode control network 100. The above-described sleep mode control method is suitable for the case where a configuration may be made such that a sleep mode is performed by the internal router 110 within sleep mode control network 100.

Figure 12:
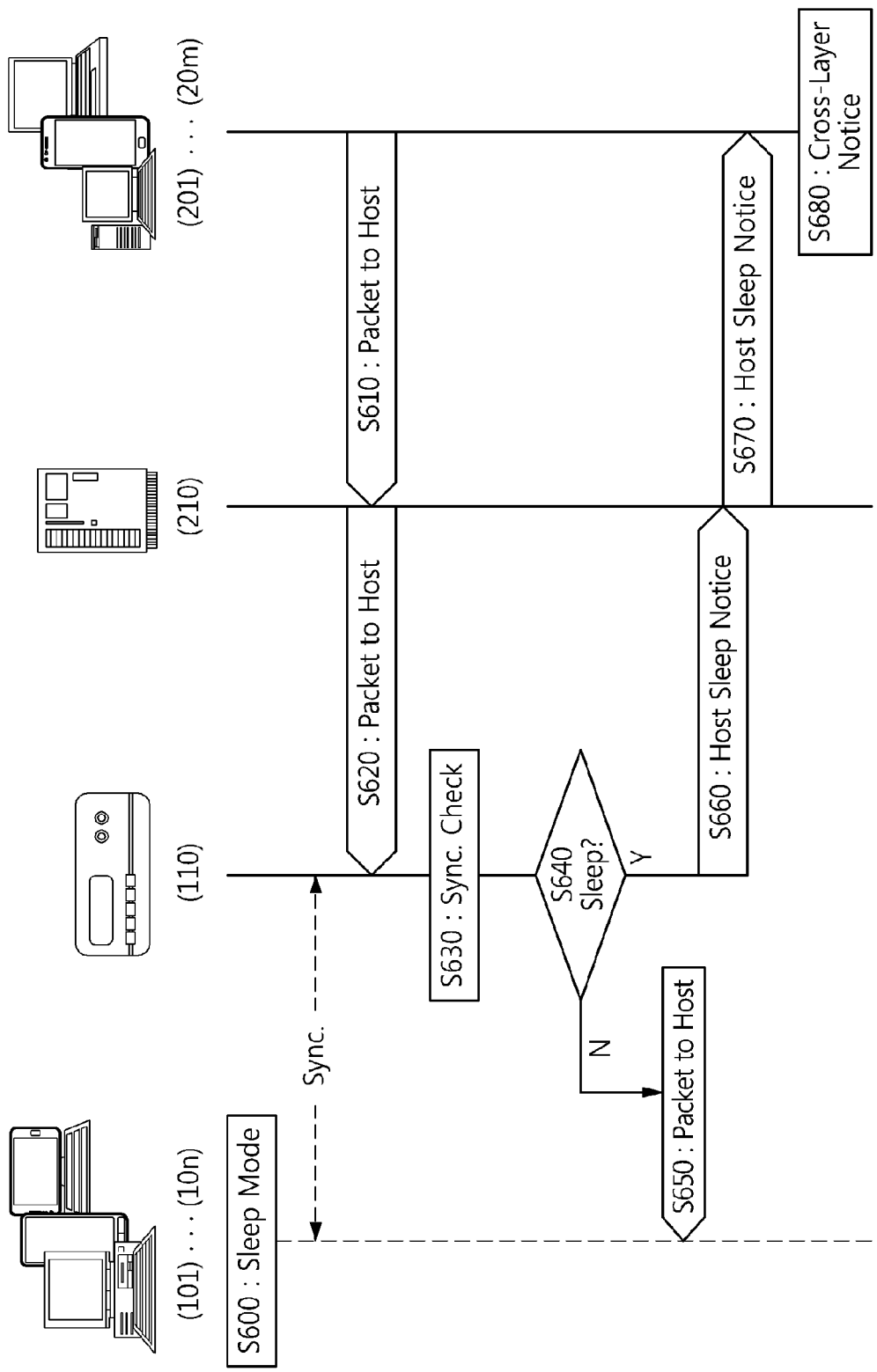
FIG. 12 is a diagram illustrating a method for sleep mode control that is performed when a communication attempt is made from an external network with internal hosts set to a sleep mode using synchronization information from an AP.

FIG. 12 illustrates a sleep mode control method in the case where a communication attempt is made from an external network with the internal hosts 101 to 10n set to a sleep mode, in a network including a sleep mode control network 100 including internal hosts 101 to 10n and the internal router 110 responsible for the communication of the internal hosts 101 to 10n, and also including an external router 210 connected to the internal router 110 responsible for the communication of the sleep mode control network 100, IP-based external hosts 201 to 20n connected via the external router 210, and an AP configured to provide synchronization information.

When a packet is transmitted to the internal router 110 from the external hosts 201 to 20n through the external router 210 at steps S610 and S620 with one or more internal hosts 101 to 10n set to a sleep mode on the sleep mode control network 100 at step S600:

the internal router 110 receives the synchronization information of a network layer from the AP at step S630;

the internal router 110 determines whether the destination host of the packet in a sleep mode at step S640;

the internal router 110, if the destination host is not in a sleep mode, transfers the packet at step S650; and the internal router 110, if the destination host of the packet is in a sleep mode, transmits a message indicative that the destination host is in a sleep mode to the external hosts 201 to 20n that have transmitted the packet via the external router 210 at steps S660 and S670. In this case, the message may be configured such that the sleep mode of the destination host is identified by selecting the error code value of the error message "destination unreachable" described in FIG. 5.

At steps S660 and S670 of transmitting the message indicative that the destination host is in a sleep mode, the external host that has received the message indicative that the destination host is in a sleep mode may transfer information about the destination host in a sleep mode from a network layer to a transport layer and an application layer using a cross-layer method, thereby enabling a communication re-attempt to be made later.

The method for IP-based sleep mode control using synchronization information according to at least one embodiment of the present invention is advantageous in that it is possible to determine whether the internal hosts 101 to 10n are in a sleep mode using synchronization information provided by the base station 301 or AP and also it is possible to efficiently deal with a request for communication with the internal hosts in a sleep mode that is made from the external hosts 201 to 20n.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method for Internet Protocol (IP)-based sleep mode control using synchronization information, the method being performed by IP-based hosts in a network including a sleep mode control network including the internal hosts and an internal router responsible for communication of the internal hosts, and also including an external router connected to the internal router responsible for communication of the sleep mode control network, IP-based external hosts connected via the external router, and a base station configured to provide a synchronization signal, the method comprising:
    setting some of the IP-based internal hosts of the sleep mode control network to a sleep mode;
    providing, by the base station, a synchronization signal with respect to the overall network, thereby transferring synchronization information of a PHY/MAC layer based on a response thereto to the internal router; and
    updating, by the internal router having received the synchronization information of the network layer from the base station, a state of the corresponding hosts to a sleep mode, and then transmitting, by the internal router, information about the internal hosts in a sleep mode to the external hosts of a history information list because the internal router stores history information of the external hosts that have communicated with the internal hosts in a sleep mode in a list form.

2. A method for Internet Protocol (IP)-based sleep mode control using synchronization information, the method being performed by an internal router in a network including a sleep mode control network including internal hosts and the internal router responsible for communication of the internal hosts, and also including an external router connected to the internal router responsible for communication of the sleep mode control network, IP-based external hosts connected via the external router, and a base station configured to provide a synchronization signal, the method comprising:
    requesting, by the internal router within the sleep mode control network, a sleep mode of the IP-based internal hosts;
    setting some of the IP-based internal hosts having received the sleep mode request from the internal router to a sleep mode;
    providing, by the base station, a synchronization signal with respect to the overall network, thereby transferring synchronization information of a PHY/MAC layer based on a response thereto to the internal router of a network layer; and
    updating, by the internal router having received the synchronization information of the network layer from the base station, a state of the corresponding hosts to a sleep mode, and then transmitting, by the internal router, information about the internal hosts in a sleep mode to the external hosts of a history information list because the internal router stores history information of the external hosts that have communicated with the internal hosts in a sleep mode in a list form.

3. The method of claim 2, wherein transferring the synchronization information of a PHY/MAC layer to the internal router of the network layer comprises transferring the synchronization information to the internal router of the network layer using a layer 2 message, layer 3 message, or cross-layer technique.

4. A method for Internet Protocol (IP)-based sleep mode control using synchronization information, the method being performed in the case where a communication attempt is made from an external network with internal hosts set to a sleep mode in a network including a sleep mode control network including the internal hosts and an internal router responsible for communication of the internal hosts, and also including an external router connected to the internal router responsible for communication of the sleep mode control network, IP-based external hosts connected via the external router, and a base station configured to provide a synchronization signal, the method comprising:
    transmitting a packet from the external hosts to the internal router via the external router, with the IP-based internal hosts having been set to a sleep mode;
    receiving, by the internal router, synchronization information of a network layer from the base station;
    determining, by the internal router, whether a destination host of the packet is in a sleep mode; and
    if the destination host of the packet is in a sleep mode, transmitting, by the internal router, a message indicative that the destination host is in a sleep mode to the external hosts having transmitted the packet via the external router.

5. The method of claim 4, wherein determining whether the destination host of the packet is in a sleep mode comprises, if the destination host of the packet is not in a sleep mode, transferring the packet.

6. The method of claim 4, wherein transmitting the message indicative that the destination host is in a sleep mode comprises transmitting a message that is configured such that the sleep mode of the destination host is identified by selecting an error code value of an error message "destination unreachable".

7. The method of claim 4, wherein transmitting the message indicative that the destination host is in a sleep mode comprises transferring, by the external host having received the message indicative that the destination host is in a sleep mode, information about the destination host in a sleep mode from a network layer to a transport layer and an application layer using a cross-layer method.

8. A method for Internet Protocol (IP)-based sleep mode control using synchronization information, the method being performed by IP-based internal hosts in a network including a sleep mode control network including the internal hosts and an internal router responsible for the communication of the internal hosts, and also including an external router connected to the internal router responsible for the communication of the sleep mode control network, IP-based external hosts connected via the external router, and an access point (AP) configured to provide synchronization information, the method comprising:
    setting some of the IP-based internal hosts within the sleep mode control network to a sleep mode;
    providing, by the AP, a synchronization signal with respect to the sleep mode control network, thereby transferring the synchronization information of a PHY/MAC layer based on a response thereto to the internal router of a network layer, so that the internal router is aware of the internal hosts in a sleep mode; and
    transmitting, by the internal router having received the synchronization information of the network layer from the AP, information about the internal hosts in a sleep mode to the external hosts of a history information list because the internal router stores history information of the external hosts that have communicated with the internal hosts in a sleep mode in a list form.

9. A method for Internet Protocol (IP)-based sleep mode control using synchronization information, the method being performed by an internal router in a network including a sleep mode control network including internal hosts and the internal router responsible for communication of the internal hosts, and also including an external router connected to the internal router responsible for communication of the sleep mode control network, IP-based external hosts connected via the external router, and an access point (AP) configured to provide synchronization information, the method comprising:

> making, by the internal router within the sleep mode control network, a request for a sleep mode of the IP-based internal hosts;
>
> setting one of the IP-based internal hosts having received the sleep mode request from the internal router to a sleep mode;
>
> providing, by the AP, a synchronization signal with respect to the sleep mode control network, thereby transferring synchronization information of a PHY/MAC layer based on a response thereto to the internal router of a network layer, so that the internal router is aware of the internal hosts in a sleep mode; and
>
> transmitting, by the internal router having received the synchronization information of the network layer from the AP, information about the internal hosts in a sleep mode to the external hosts of a history information list because the internal router stores history information of the external hosts that have communicated with the internal hosts in a sleep mode in a list form.

10. A method for Internet Protocol (IP)-based sleep mode control using synchronization information, the method being performed when a communication attempt is made from an external network with the internal hosts set to a sleep mode in a network including a sleep mode control network including the internal hosts and the internal router responsible for communication of the internal hosts, and also including an external router connected to the internal router responsible for communication of the sleep mode control network, IP-based external hosts connected via the external router, and an access point (AP) configured to provide synchronization information, the method comprising:

> transmitting a packet to the internal router from the external hosts through the external router with one or more internal hosts set to a sleep mode on the sleep mode control network;
>
> receiving, by the internal router, synchronization information of a network layer from the AP;
>
> determining, by the internal router, whether a destination host of the packet in a sleep mode; and
>
> if the destination host of the packet is in a sleep mode, transmitting, by the internal router, a message indicative that the destination host is in a sleep mode to the external hosts that have transmitted the packet via the external router.

11. The method of claim 10, wherein determining whether the destination host of the packet in a sleep mode comprises, if the destination host is not in a sleep mode, transferring the packet.

12. The method of claim 10, wherein transmitting the message indicative that the destination host is in a sleep mode comprises transmitting a message that is configured such that the sleep mode of the destination host is identified by selecting an error code value of an error message "destination unreachable".

13. The method of claim 10, wherein transmitting the message indicative that the destination host is in a sleep mode comprises transferring, by the external host having received the message indicative that the destination host is in a sleep mode, information about the destination host in a sleep mode from a network layer to a transport layer using a cross-layer method, thereby enabling a communication re-attempt to be made later.

* * * * *